April 8, 1952     O. GROSVENOR     2,592,275
CONVEYER APPARATUS
Filed May 14, 1948     2 SHEETS—SHEET 1
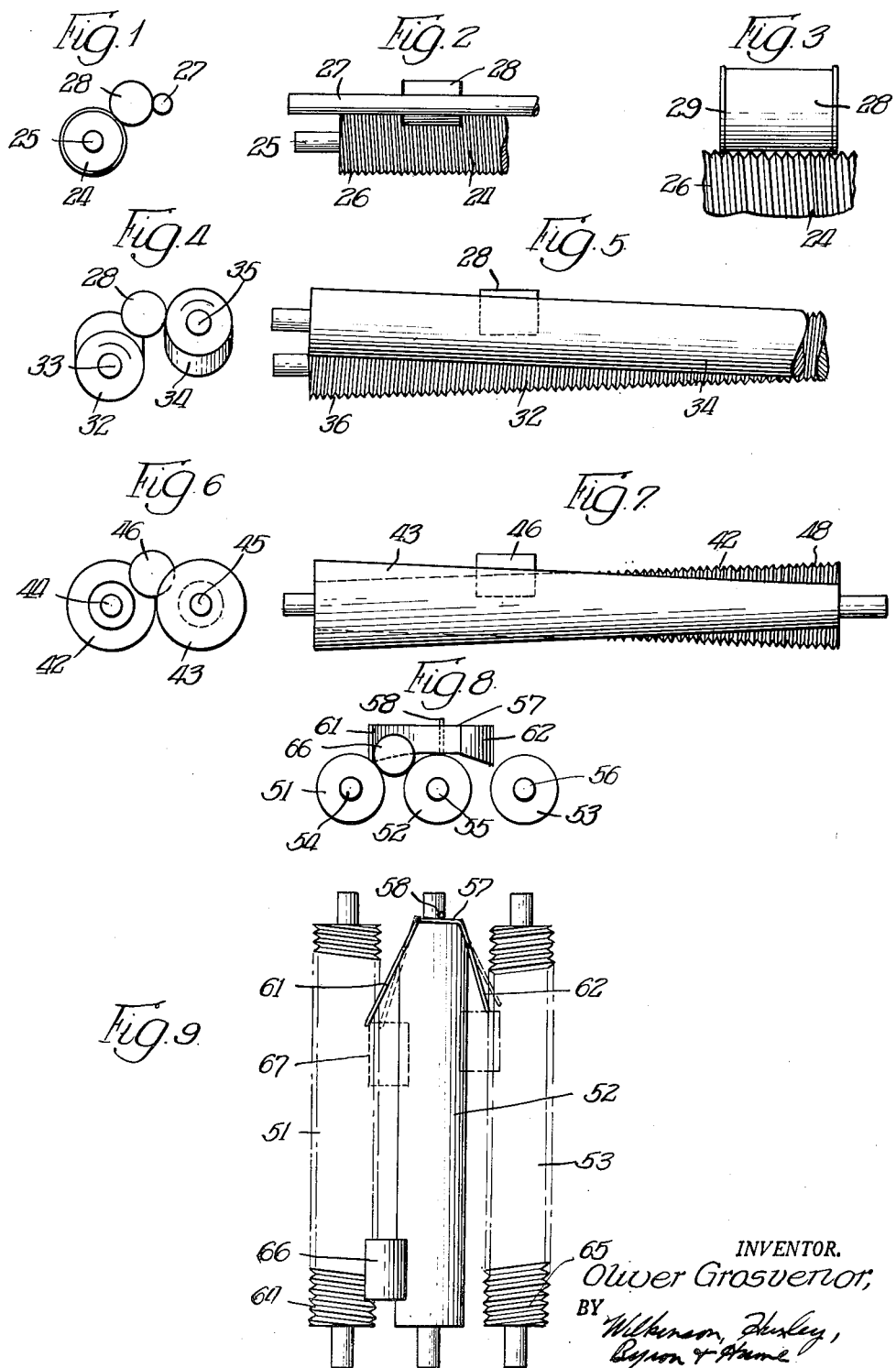
INVENTOR.
Oliver Grosvenor April 8, 1952  O. GROSVENOR  2,592,275
CONVEYER APPARATUS
Filed May 14, 1948   2 SHEETS—SHEET 2
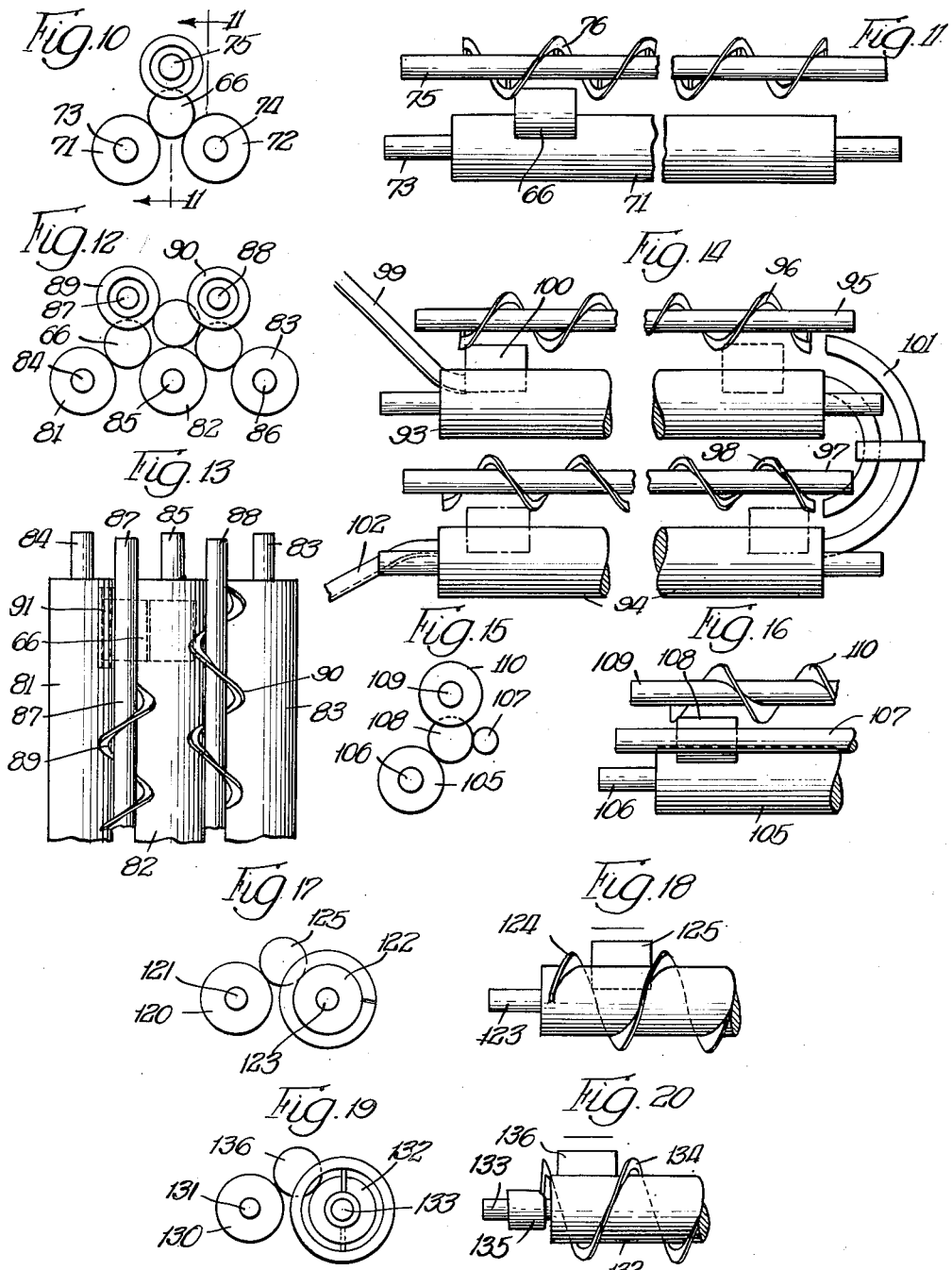
INVENTOR.
Oliver Grosvenor,
BY Patented Apr. 8, 1952

2,592,275

UNITED STATES PATENT OFFICE 2,592,275

CONVEYER APPARATUS

Oliver Grosvenor, Morrison, Ill., assignor to Libby, McNeill & Libby, Chicago, Ill., a corporation of Illinois Application May 14, 1948, Serial No. 26,979

4 Claims. (Cl. 198—25)

This invention relates to a new and improved conveyor, and more particularly to a conveyor of the type adapted to move articles or units in the general direction of the length of the conveyor and, at the same time, to rotate said units about an axis within the unit.

The invention relates to conveyors of the type which comprises one or more rolls, the rolls each serving to support a portion of the weight of the units being conveyed. Where a single roll is used, a guide extends generally parallel and adjacent the roll to partially support the units and to guide them in their movement. In forms of construction comprising a plurality of adjacent rolls, the units are moved along the trough between an adjacent pair of rolls. Helical means are provided for the purpose of causing the units to move generally longitudinally of the rolls. These helical means may take a variety of forms. They may comprise flanges, ridges or fins formed on or secured to one of the rolls. They may take the form of a helical member concentric with one of the rolls, but rotatable independently thereof. They may also take the form of helical means adjacent the roll or rolls or adjacent the trough between a pair of rolls and supported and rotated independently of the rolls.

Conveyors of this character may be used for many purposes as, for example, heat transfer to or from the contents of the units being conveyed when the units comprise bottles, jars or cans containing materials, such as foods, which require heat treatment in their processing. The rotation of the unit permits all portions of its surface to have the same contact with the heating or cooling fluid. Rotation also serves to uniformly agitate the contents of the unit, thus facilitating heat transfer and equalizing the heating of the contents. This results in uniform treatment of the contents and, also, greatly increases the rapidity of heat transfer during such processes as the sterilization of foods by heat and their subsequent cooling. The means for supplying heating or cooling media form no part of the present invention and will not be described in detail. It will be obvious that the conveyor may be located in or extend through closed heating chambers, autoclaves or the like.

Another purpose for which the conveyor may be used is in connection with the application of a surface treatment or coating to the units being handled. The constant movement and rotation insure the application of a uniform coating of paint, lacquer or the like. In carrying out the various processes suggested, or other processes which may require similar unit movements, the conveyor will not only give a uniform treatment and provide a uniform product, but will reduce the cost and time of handling the units.

It is an object of the present invention to provide a new and improved conveyor adapted to both rotate and translate the units or articles being handled.

It is a further object to provide a conveyor in which the speeds of rotation and linear movement of the units handled may be independently controlled.

It is another object of the invention to provide a conveyor in which the translating means also serves to move the units from one conveyor element to another for further similar or different treatment.

It is also an object to provide a conveyor which is adapted for a wide variety of commercial uses and which may be correspondingly modified in details of construction.

Other and further objects will appear as the description proceeds.

I have shown certain preferred embodiments of my invention in the accompanying drawings, in which:

Figure 1 is an end elevation of one form of construction;

Figure 2 is a fragmentary side elevation of the form of construction shown in Figure 1;

Figure 3 is an enlarged fragmentary elevation of the roll and units of Figure 2;

Figure 4 is an end elevation of a construction including a threaded roll and a smooth roll;

Figure 5 is a side elevation of the form of construction shown in Figure 4;

Figure 6 is an end view of a construction including tapered rolls;

Figure 7 is a side elevation of the construction of Figure 6;

Figure 8 is an end elevation of a multiple roll construction including a transfer guide;

Figure 9 is a plan view of the construction of Figure 8;

Figure 10 is an end view of a construction including a pair of rolls and separate helical means for translating units on the rolls;

Figure 11 is an elevation of the construction of Figure 10, taken on line 11—11;

Figure 12 is an end elevation of a multiple roll conveyor having separate means for moving and transferring units;

Figure 13 is a plan view of the construction of Figure 12;

Figure 14 is a partial side elevation of a construction using superposed pairs of rolls with transfer means;

Figure 11 is an end elevation of a construction including a single roll, fixed guide means and a screw conveyor;

Figure 16 is a fragmentary side elevation of the form of construction shown in Figure 15;

Figure 17 is an end elevation of a construction using two rolls with a helix attached to one roll;

Figure 18 is a partial side elevation of the construction of Figure 17;

Figure 19 is an end elevation of a construction using two rolls, with a helical ribbon conveyor concentric with one roll; and Figure 20 is a partial side elevation of the construction of Figure 19.

The form of construction shown in Figures 1, 2 and 3 comprises a roll 24 supported and rotated on shaft 25. This roll, as shown in Figures 2 and 3, is provided with a threaded surface 26. Adjacent and parallel to the axis of the roll is located the fixed guide or support bar 27. The article or unit being rotated and moved by the conveyor is indicated at 28. This article, in the forms shown, is a can having the usual crimped ridges 29 at its top and bottom. The thread here shown is a quadruple thread which causes substantial linear movement of the can 28 for each rotation of the roll. It will be understood that this thread may be of any desired pitch and character, depending upon relative speeds of rotation and translation which may be desired. The roll 24 is rotated in the counterclockwise direction, as seen in Figure 1, in order to move the can 28 to the right, as seen in Figures 2 and 3.

The form of construction shown in Figures 4 and 5 comprises the roll 32 rotated on the stub shafts 33 and the roll 34 supported and rotated on shafts 35. The can 28 is seen as carried by the rolls. It will be noted that the axes of the two rolls are angularly disposed rather than parallel, while the rolls are located sufficiently closely together to form a trough to receive and carry the can 28. In this case, the roll 32 is shown as threaded at 36, the thread being inclined in the reverse direction from the thread shown in Figures 2 and 3. Thus, with roll 32 and roll 34 both rotating in the clockwise direction, as seen in Figure 4, the can will move to the right, as seen in Figure 5.

The form of construction shown in Figures 6 and 7 comprises a pair of frusto-conical rolls 42 and 43 carried on shafts 44 and 45. These rolls move the can, or other article, shown at 46. As best shown in Figure 7, the small end of roll 42 is located opposite the large end of the roll 43. The axes of the rolls are parallel and they form a trough between them. This trough is such, however, as to cause the longitudinal movement of the object 46 to be non-rectilinear and also non-parallel to the axis of either roll. The roll 42 is shown as threaded, as indicated at 48. The other roll 43 is preferably smooth so that the speed of the longitudinal movement is controlled by the threaded roll.

The form of construction shown in Figures 8 and 9 comprises a series of three parallel cylindrical rolls 51, 52, and 53 carried on axles 54, 55 and 56, respectively. A pivoted transfer member 57 is located adjacent one end of the rolls, as best shown in Figure 9, this member being movable about the pivot 58. The weight of the member and its pivot are so related that it normally maintains the full line position shown in Figure 9. The member has a long leg or arm 61 and a short leg 62.

As best shown in Figure 9, the rolls 51 and 53 are threaded as shown at 64 and 65. These threads extend in opposite directions on the two rolls so as to move the can or other unit 66 in opposite directions in the two passes. All of the rolls are normally rotated in the same direction, this being the clockwise direction, as seen in Figure 8. It will be apparent that this will cause the unit 66 to move to the dotted line position at 67, at which time it will engage the inclined inner face of the long leg 61 of the transfer member 57. Continued forward movement of the unit 67 will cause it to move to the right and to the top of the center roll 52, and it will then drop down in the trough between rolls 52 and 53.

As the can or other unit being conveyed passes over roll 52, it will engage the short leg 62 of transfer member 57, swinging that member to the broken line position. This will cause the long leg 61 to move to the broken line position, where it will engage the end of the succeeding unit 66 and prevent its passing over roll 52 and clogging the apparatus until the initial unit has passed in the reverse direction to clear the shorter leg 62. As soon as the short leg 62 is cleared, the member 57 will be swung by gravity to its full line position and succeeding units may follow the same path. The reverse thread 65 on roll 53 causes a reverse movement of the unit 66 so that it passes downwardly, as seen in the plan view of Figure 9.

While these various forms of construction have been shown as having one or more rolls threaded, it will be found that this is not necessary in order to cause lineal movement of the objects being conveyed. The use of threads does, however, control quite closely the linear speed of the objects in relation to the speed of rotation of the rolls. Thus, a machine may be designed and operated to cause an object to have any desired linear speed and, at the same time, to have any desired speed of rotation within broad limits.

The form of construction shown in Figures 10 and 11 comprises a pair of rolls 71 and 72 which are located parallel to each other and carried on axles or stub shafts 73 and 74. This pair of rolls provides a trough to receive unit 66 which it is desired to rotate and move in a longitudinal direction. The shaft 75 located above the trough between rolls 71 and 72 carries the helical ribbon conveyor 76. The pitch of this conveyor is greater than the length of the units to be conveyed so that the units fit between successive convolutions. It will be apparent that the shaft 75 may be rotated at a speed independent of the speed of rotation of rolls 71 and 72. This permits any desired relationship between the linear movement of the object and its rotary speed.

The form of construction shown in Figures 12 and 13 differs from that of Figures 10 and 11 in that it comprises three parallel cylindrical rolls 81, 82 and 83 carried on axles 84, 85 and 86. The shafts 87 and 88 are located above the trough between the respective pairs of rolls, and these shafts carry the helical ribbon conveyors 89 and 90. The helical conveyor 89, as shown in Figure 13, terminates in a flange 91 which is carried by shaft 87 and extends radially from the shaft and parallel to the shaft axis. The direction of rotation of shaft 87 is such that the cans or other objects 66 are moved upwardly, as seen in the plan view of Figure 13. When such objects reach the flange 91, continued rotation of the shaft 87 causes this flange to thrust the can laterally over the intermediate roll 82 and it rolls thence, by gravity, to the trough between rolls 82 and 83. The direction of rotation of shaft 88 is such that the helical conveyor 90 causes the unit to move in the downward direction, as seen in Figure 13.

The form of construction shown in Figure 14 comprises an upper pair of rolls 93 and a lower pair of rolls 94. The shaft 95 and helical conveyor 96 are located above the trough between the upper pair of rolls 93. A similar shaft 97 and conveyor 98 are located above the trough between the lower rolls 94. The guide 99 causes the unit, as shown at 100, to pass by gravity onto the trough between upper rolls 93. The helix 96 passes these units to the right end of the rolls, as seen in Figure 14. The units then pass through the arcuate guideway 101 and are delivered by gravity to the trough between the lower set of rolls 94. The helix 98 operates in the reverse direction from the upper helix 96 and the objects are now passed from right to left along the lower pair of rolls 94. The units discharge from the left end of these rolls onto the downwardly inclined chute 102, from which they may may be delivered by gravity to any desired point.

The form of construction shown in Figures 15 and 16 is generally similar in its method of operation to the forms shown in Figures 10 and 11. This form includes the roller 105 carried by axles 106. The fixed guide bar 107 is shown as extending parallel to the axis of the roller 105 and above it in such a position as to provide a trough for holding the objects 108 which are being conveyed. The shaft 109 carrying the helical conveyor 110 is located above the trough formed between the roll 105 and the guide bar 107.

The form of construction shown in Figures 17 and 18 comprises a roll 120 carried on axles 121. A second roll 122 is carried on axles 123 parallel to roll 120. This roll 122 carries the helical flange 124 which serves to move the objects 125 to the right, as seen in Figure 18, when the roll 122 is rotated in the clockwise direction, as seen in Figure 17.

The form of construction shown in Figure 19 comprises a roll 130 carried on axles 131. Parallel to the roll 130 is a single roll 132 carried on stub shafts or axles 133. The helical conveyor 134 is carried on sleeves 135 which fit rotatably on the shafts 133 of the roller 132. Thus, it will be seen that the helix may be rotated by any suitable means at a speed independent of the speed of rotation of the roll 132. This rotation will move the units 136 to the right, therefore, at a speed which may be determined independently of a speed at which the units are rotated.

It will be understood that all of the various forms of construction shown may be used with any desired type of mechanical supporting means and driving means. Such means form no part of the present invention and any usual construction may be utilized. Also, it will be understood that the various forms of construction may be located in chambers for heating or cooling the objects being conveyed or for applying external coatings to such objects. The linear speed of movement and the speed of rotation of the units may be controlled through wide limits, as desired. The specific constructions shown are to be understood as illustrative only, as I contemplate such modifications as come within the spirit and scope of the appended claims.

I claim:

1. A conveyor comprising a rotatable roll, a second member extending adjacent the roll for supporting a unit to be conveyed jointly with the roll, and helical means for moving the unit longitudinally of the roll, said helical means comprising a shaft and a helical flange carried thereby, the shaft being located adjacent the roll and rotatable independently of the rotation of the rotatable roll to cause the helical flange to move a unit longitudinally of the roll independently of the rotation of the unit.

2. The invention of claim 1 further including means carried by the shaft for moving the unit laterally relative to the roll.

3. A conveyor comprising a rotatable roll, guide means adjacent the roll forming a trough with the roll for retaining a unit to be conveyed in contact with the roll, and helical means located above and spaced from the roll and guide means and adjacent the trough and rotatable independently of the roll to move such unit longitudinally of the roll independently of the rotation of the unit by the roll.

4. The invention of claim 3 further including means for moving the unit laterally with respect to said trough.

OLIVER GROSVENOR.

REFERENCES CITED

The following references are of record in the file of this patent:

UNITED STATES PATENTS

| Number | Name | Date |
|---|---|---|
| 1,530,415 | Roussel | Mar. 17, 1925 |
| 1,566,611 | Lister | Dec. 22, 1925 |
| 1,702,554 | Walker | Feb. 19, 1929 |
| 1,741,981 | Dewey et al. | Dec. 31, 1929 |
| 1,750,329 | Patchen et al. | Mar. 11, 1930 |
| 1,777,039 | Hatch | Sept. 30, 1930 |